(12) United States Patent  
Till

(10) Patent No.: US 6,374,089 B1
(45) Date of Patent: Apr. 16, 2002

(54) ROTARY DAMPER

(75) Inventor: David P. Till, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/272,070

(22) Filed: Mar. 18, 1999

(51) Int. Cl.$^7$ ................................. H04B 1/38
(52) U.S. Cl. ...................... 455/90; 455/128; 455/575
(58) Field of Search .................... 188/130, 290, 188/291, 276, 293, 294; 192/58.4; 16/82, 85; 455/90, 347, 575, 128; 379/428, 433

(56) References Cited

U.S. PATENT DOCUMENTS

| | | | | |
|---|---|---|---|---|
| 4,426,752 A | * | 1/1984 | Nakayama | 16/82 |
| 4,550,470 A | * | 11/1985 | Omata | 16/85 |
| 4,574,423 A | * | 3/1986 | Ito et al. | 16/85 |
| 4,893,522 A | * | 1/1990 | Arakawa | 74/574 |
| 5,064,033 A | * | 11/1991 | Koike et al. | 188/306 |
| 5,067,625 A | * | 11/1991 | Numata | 220/343 |
| 5,151,946 A | * | 9/1992 | Martensson | 455/550 |
| 5,296,790 A | * | 3/1994 | Fincher | 318/560 |
| 5,413,317 A | * | 5/1995 | Spoerre | 267/134 |
| 5,636,275 A | * | 6/1997 | Takagi et al. | 379/433 |
| 5,651,536 A | * | 7/1997 | Daul | 267/205 |
| 5,834,867 A | * | 11/1998 | Kikuchi et al. | 310/51 |
| 6,125,289 A | * | 9/2000 | Lee | 455/575 |

* cited by examiner

Primary Examiner—Dwayne Bost
Assistant Examiner—Sonny Trinh
(74) Attorney, Agent, or Firm—Coats & Bennett, P.L.L.C.

(57) ABSTRACT

A rotary damper uses a motor to selectively dynamically brake the rotational movement between a housing and a cover of a wireless communications device. A clutch that is moveable between an engaged position and a disengaged position connects the motor to the cover so that the relative rotational movement between the housing and the cover in at least one rotational direction is resisted by the motor when the clutch is in an engaged position. The clutch preferably includes a coupler axially moveable between a deployed position directly engaging the flip cover and a retracted position disengaged from the cover, and an actuator moveable between a first position and a second position so as to cause the coupler to assume the deployed position and the retracted position, respectively. The actuator preferably includes a spring to bias the coupler towards the deployed position. A shaft preferably extends through the motor and connects the actuator to the coupler. The coupler may rotate at a slower speed relative to the shaft or may rotate at the same speed. The rotary damper may also include an eccentric weight attached to the shaft so as to spin therewith. When the clutch is in the disengaged position, the motor may intermittently spin the shaft causing the eccentric weight to spin, thereby imparting a shaking motion to the overall phone.

31 Claims, 4 Drawing Sheets

ROTARY DAMPER

FIELD OF THE INVENTION

The present invention relates to the field of wireless communications devices, and more particularly to a rotary damper for use in wireless communications devices.

BACKGROUND OF THE INVENTION

Wireless communications devices, such as cellular telephones, typically have a portion of their housings that rotate about one or more hinge points to selectively cover and uncover the keypad, display, etc. A common example of such a moveable cover is known in the art as a flip cover. It is desirable for these flip covers to have some amount of resistance when being opened and/or closed so that the user does not perceive the device to be of poor or flimsy construction.

One typical method providing such resistance is to employ a frictional fit between the flip cover and the main housing. However, this approach relies on tight tolerances and is also subject to wear over time. Another approach is to employ a rotational damper, or dashpot, to resist the rotational movement of the flip. This approach is useful, but consumes valuable space.

Wireless communications devices typically announce an incoming call, or other alarms, by ringing. However, audible ringing is not appropriate in some situations, so many cellular telephones are equipped with alternative announcement means such as a vibrator for generating a vibratory motion to alert the user. Such vibrators typically operate by moving a weight non-symmetrically within the main housing or flip cover so as to shift the center of gravity of the device.

Due to the emphasis on decreased size, space considerations are very important when designing a wireless communications device. As a result, and due to manufacturing considerations, it is preferred that multiple functions be designed into each component. To date however, the space consuming vibrator and the space consuming rotary damper have not been combined. As such, there remains a need for a new design of rotary damper that can be easily manufactured and installed, and that will consume minimal space. Preferably, but not necessarily, such a rotary damper would also include a built-in vibrator mechanism.

SUMMARY OF THE INVENTION

Wireless communications devices according to the present invention utilize a rotary damper having motor to selectively dynamically brake the rotational movement between a housing and a cover of a wireless communications device. The motor is secured to either the housing or the cover of the wireless communications device. For purposes of illustration only, the motor will be attached to the housing of a cellular telephone and the cover will be a flip cover. A clutch that is moveable between an engaged position and a disengaged position selectively connects the motor to the flip cover so that the relative rotational movement between the housing and the cover in at least one rotational direction, and preferably both, is resisted by the motor when the clutch is in an engaged position. The clutch preferably includes a coupler axially moveable between a deployed position directly engaging the flip cover and a retracted position disengaged from the cover, and an actuator moveable between a first position and a second position so as to cause the coupler to assume the deployed position and the retracted position, respectively. The coupler may include a plurality of outwardly extending teeth that mate with corresponding teeth on the cover when the coupler is in the deployed position. The actuator preferably includes a spring to bias the coupler towards the deployed position. A shaft preferably extends through the motor and connects the actuator to the coupler. The coupler may rotate at a slower speed relative to the shaft or may rotate at the same speed.

In some preferred embodiments, the rotary damper includes an eccentric weight rotatably driven by the motor so as to generate a vibration when the clutch is in the disengaged position. This eccentric weight may be attached to the shaft so as to spin therewith. For instance, the motor may, when the clutch is in the disengaged position, intermittently spin the shaft causing the eccentric weight to spin, thereby imparting a shaking motion to the overall phone.

A wireless communications device equipped with the rotary damper of the present invention relies on electromotive damping force from a motor to provide the dynamic braking of the rotational movement between the housing and the cover. Because this electromotive force may be easily controlled, the rotary damper provides greater flexibility in function, such as by allowing the cover to be driven or held open when appropriate. In addition, the incorporation of the optional eccentric weight allows for the rotary damper and the vibrator of a wireless communications device to be combined into a single compact package. The motor of the rotary damper is used to both resist the rotation of the flip cover (via the coupler and shaft) when the coupler is in the deployed position and to spin the eccentric weight, when appropriate, when the coupler is in the retracted position.

BRIEF DESCRIPTION OF THE INVENTION

DETAILED DESCRIPTION

Figure 1:
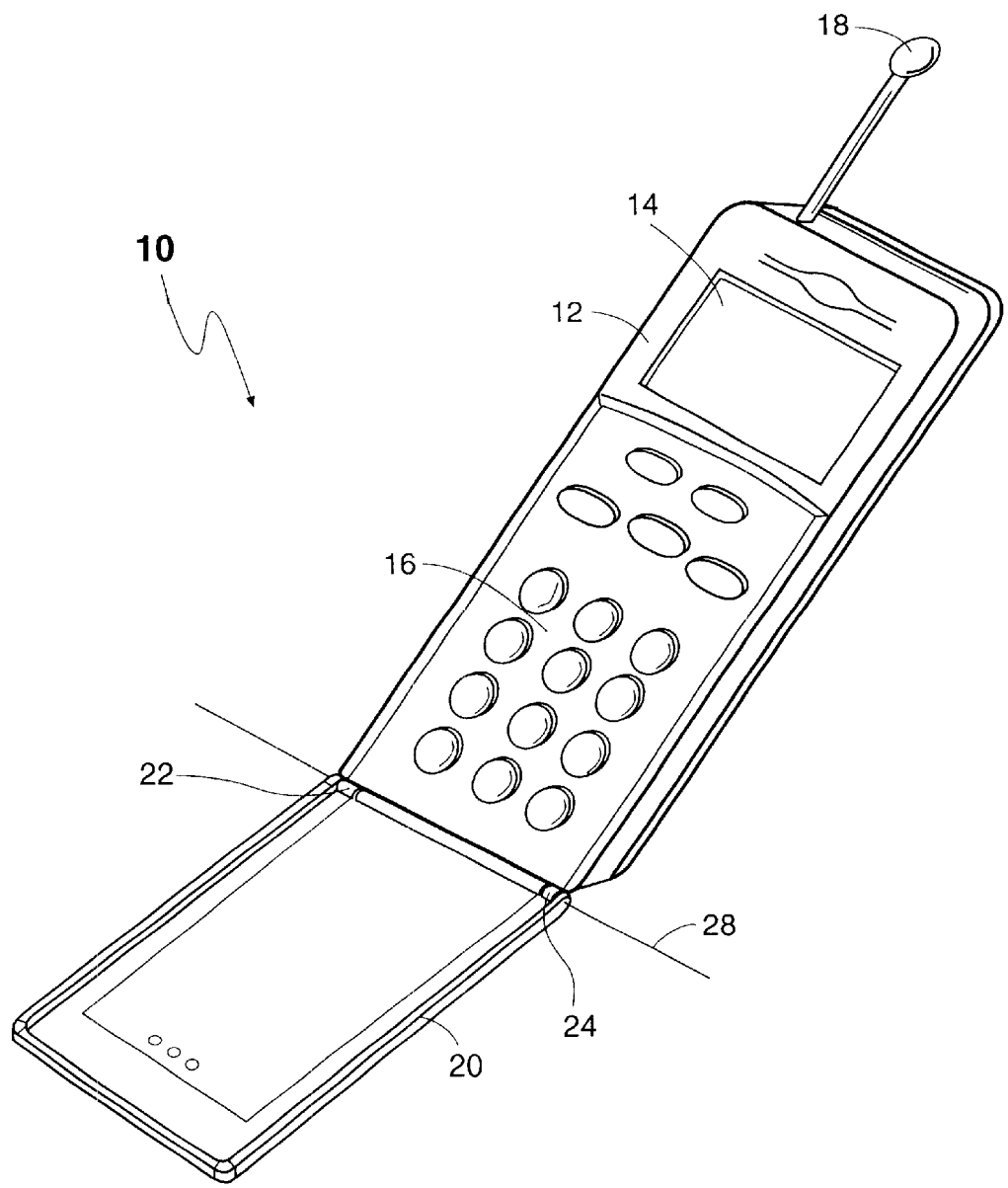
FIG. 1 is a simplified perspective view of a cellular phone wireless communications device with a flip cover open.

Wireless communications devices 10, such as cellular telephones, typically include a main housing 12 having a display 14, keypad 16, antenna 18, etc. See FIG. 1. Attached to the main housing 12 is a cover 20 which is moveable between a closed position and an open position, typically by pivoting about a pair of hinges 22,24. When the cover 20 is in the open position, the keypad 16 is preferably fully exposed for normal operation. The angular relation between the cover 20 and the main housing 12, in the open position, may vary widely depending on design choice. Such covers are typically referred to as flip covers 20. For clarity, a cellular telephone will be used as an illustrative example of a wireless communications device 10; however, the present invention is intended to apply to any wireless communications device 10, such as cellular telephones, satellite telephones, pagers, personal digital assistants, and the like that have moveable covers and vibratory alert mechanisms.

Figure 2:
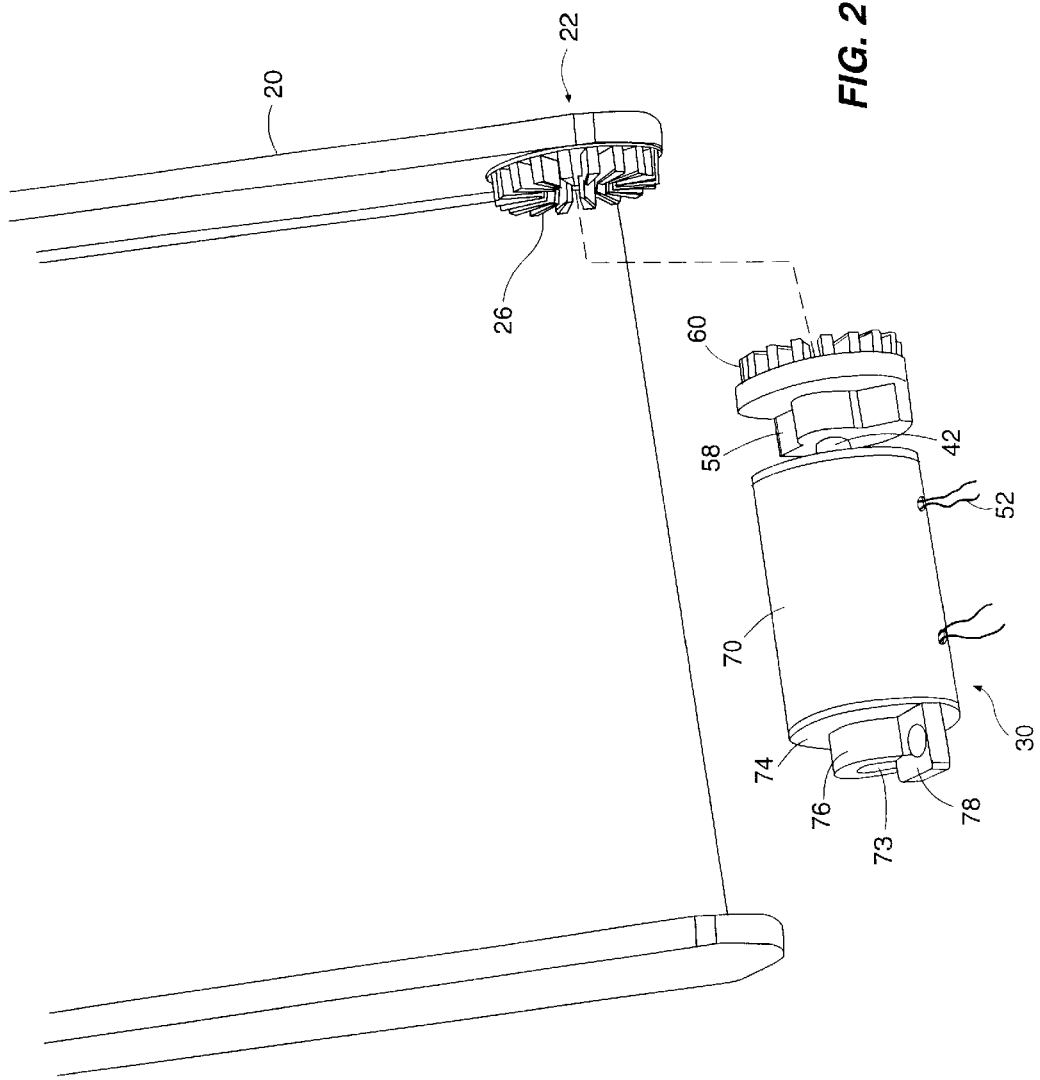
FIG. 2 is partially exploded perspective view of the rotary damper of the present invention and a flip cover.

The rotary damper 30 of the present invention acts to resist the rotational movement of the flip cover 20 when opening, and preferably when closing, the flip cover 20. As shown in FIG. 2, the portion of the flip cover 20 near one hinge 22 includes a plurality of inwardly extending teeth 26. These teeth 26 are preferably arranged radially about the flip cover's axis of rotation 28. The number, size, and particular shape of the teeth 26 are a matter of design choice, with almost any configuration being suitable to the task. This description assumes that only one hinge 22 has an associated rotary damper 30; the opposing hinge 24 may be of any conventional type. However, it is understood that each hinge 22,24 may have a rotary damper 30 if so desired.

Figure 3:
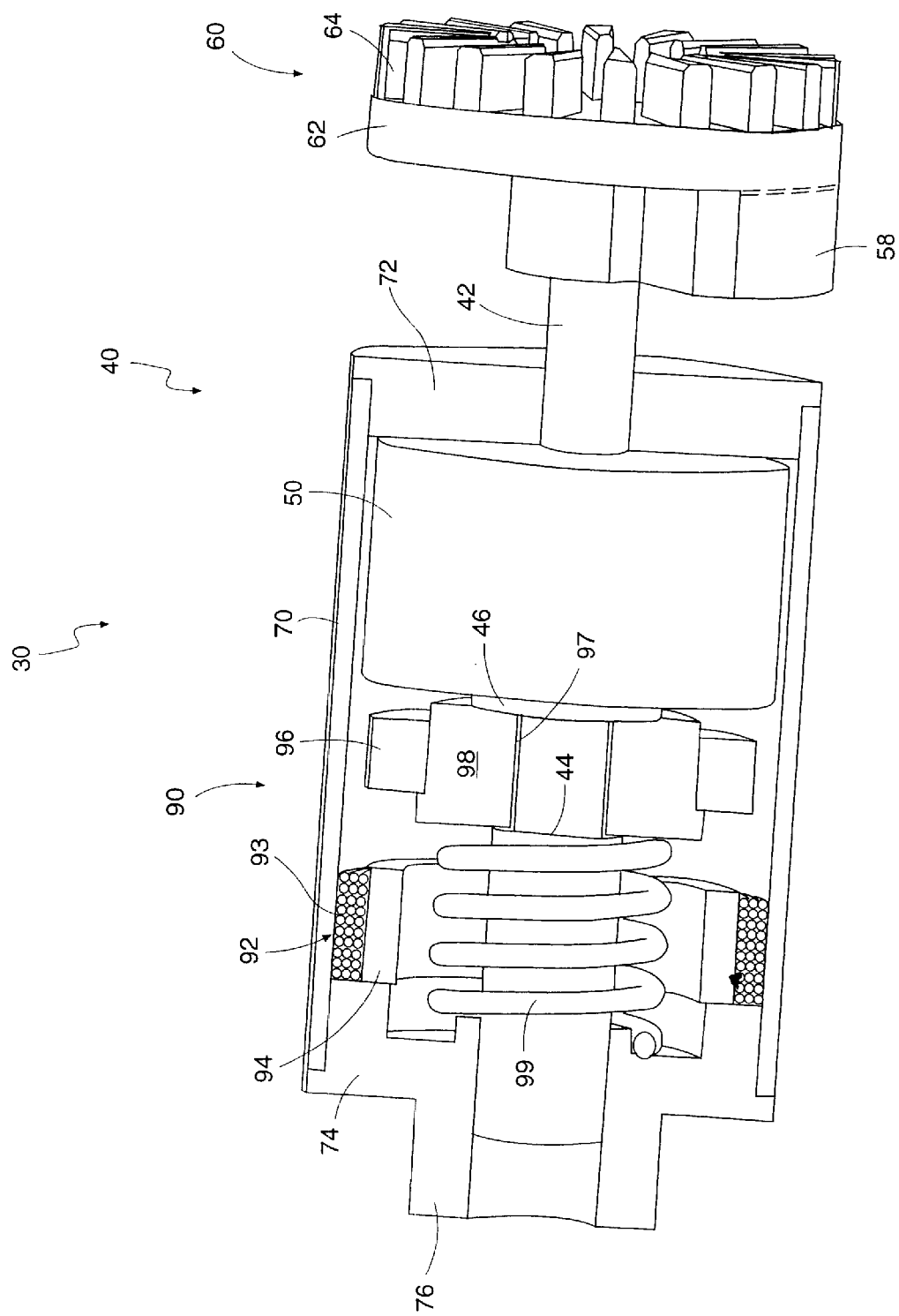
FIG. 3 is one embodiment of the rotary damper of the present invention with the casing partially removed to show internal components.

As shown in FIG. 2 and FIG. 3, the rotary damper 30 of this illustrative embodiment includes a clutch 40, a motor 50, and an optional weight 58. The clutch 40 typically includes a shaft 42, a coupler 60, and an actuator 90. The shaft 42 may be of any cross-sectional shape, but is preferably circular in cross-section throughout. The shaft 42 may be of one-piece construction or may be of multiple sections rotationally coupled together, including multiple sections coupled through a gear reduction system or the like. The coupler 60 of this embodiment includes a generally circular disk 62 having a plurality of outwardly extending teeth 64. These teeth 64 are arranged so as to fit between, and mate with, the corresponding teeth 26 on the flip cover 20 and are preferably tapered on their outermost edges. The coupler 60 may be formed integrally with the shaft 42, or may be merely selectively coupled thereto.

The shaft 42 extends into a casing 70. The casing 70 is preferably a generally cylindrical body having an interior cavity bounded by two end caps 72,74. The end caps 72,74 include suitable holes 73 for supporting the shaft 42 and allowing the shaft 42 to pass through. While the holes 73 may have bushing surfaces, or may include separate bearings, even plain holes 73 with suitable clearance are acceptable. The rear end cap 74 preferably includes an embossment 76 for protecting the shaft 42 when it is retracted, as discussed below. Further, a suitable mounting flange 78 (FIG. 2) may be included on the rear end cap 74, or at any other location on the casing 70, for securing the rotary damper 30 to the main housing 12 of the phone 10.

Internal to the casing 70 are the motor 50 and actuator 90. The motor 50 drives the shaft 42 causing the shaft 42 to rotate. The motor 50 may be of any suitable type, but is preferably an electromagnetic motor 50 wherein the shaft 42 functions as a rotor. Suitable wires 52 are routed to the motor 50 for selectively energizing the motor 50. The wires 52 may run through the casing 70 and connect to appropriate control electronics (not shown). The details of the motor control electronics are well known in the art and further discussion thereof is not necessary to understanding or practicing the present invention.

The actuator 90 of this illustrative embodiment includes an electromagnet 92, a plunger ring 96, and a spring 99. The plunger ring 96 is a generally circular ring coupled to the shaft 42 via a bearing 97. The bearing 97 allows the shaft 42 to freely rotate with respect to the plunger ring 96. The plunger ring 96 should be made from a suitably magnetic material, such as ferrite. A plastic (or other non-magnetic material) spacer 98 may be employed between the bearing 97 and the magnetic material to reduce the weight of the plunger ring 96. The plunger ring 96 should be secured along the length of the shaft 42 so that axial movement of the plunger ring 96 causes the shaft 42 to likewise move axially. For instance, the plunger ring 96 may be placed between a snap ring 46 and a shoulder 44 on the shaft 42. Between the plunger ring 96 and the rear end cap is a spring 99. The spring 99 presses against the plunger ring 96 so as to bias the shaft 42, and therefore, the coupler 60, outwardly to engage the coupler 60 with the flip cover 20. The electromagnet 92 is used to overcome the spring 99 bias and pull the plunger ring 96, and thus the shaft 42 and coupler 60, axially to the left as shown in FIG. 3 to disengage the coupler 60 from the flip cover 20. The electromagnet 92 preferably includes windings 93 surrounding a ferric core 94. In some embodiments, the actuator 90 may include a common solenoid (not shown) with the shaft 42 being a rotatable plunger portion thereof.

The optional weight 58 is disposed inwardly from the coupler 60. The weight 58 may be attached to the shaft 42, but is preferably attached to, or formed integrally with, the back side of the disk 62. Alternatively, This eccentric weight 58 is non-symmetrically disposed about the axis of the shaft 42 so that the weight 58 will cause the phone 10 to vibrate when the weight 58 spun about the shaft 42. Alternatively, the weight 58 may be coupled to the shaft 42 in any manner known in the art so as to rotate therewith as described below.

In operation, the electromagnet 92 exerts a pulling force on the magnetic portions of the plunger ring 96 when the windings 93 are energized, thereby pulling the plunger ring 96 towards the electromagnet 92. As the plunger ring 96 moves, the plunger ring 96 presses against the shoulder 44, thereby causing the shaft 42 to move, which in turn causes the coupler 60 to move. For ease of reference, the coupler 60 is in the "deployed" position when the shaft 42 is pushed outwardly (to the right in FIG. 3), by the spring 99 in the described embodiment. In the deployed position, the teeth 64 on the coupler 60 engage the corresponding teeth 26 on the flip cover 20. Conversely, the coupler 60 is in the "retracted" position when shaft 42 is pulled inwardly (to the left in FIG. 3), by the electromagnet 92 and plunger ring 96 in the described embodiment. In the retracted position, the teeth 64 of the coupler 60 are disengaged from the teeth 26 on the flip cover 20 such that the coupler 60 may rotate without causing the flip cover 20 to rotate. Also, when the shaft 42 is retracted, the end of the shaft 42 opposite the coupler 60 is preferably protected from interference by the optional embossment 76 on the rear end cap 74.

With the coupler 60 in the deployed position, the rotational force generated by opening the flip cover 20 is transmitted to the motor 50 via the coupler 60 and shaft 42. Even in an unpowered state, the motor 50 resists the spinning movement of the shaft 42 due to the magnetic drag of the rotor (the shaft 42) in relation to the stator. The amount of resistance may be increased by applying a suitable electric current to the motor 50; or, alternatively, applying a suitable electric load, such as a resistor, to the drive circuit for the motor 50. That is, the motor 50, when run in reverse, acts as an electrical generator, thereby applying a load against the rotation of the shaft 42. Thus, the motor 50 coupled to the coupler 60 acts as a rotary damper 30 to resist the rotational movement of the flip cover 20. By suitable electric circuit design, well known in the art, the motor 50 may provide such resistance only in one direction, such as opening the flip cover 20, or may provide resistance, at the same or a different level, in both directions.

Besides the rotary dampening action described immediately above, the rotary damper 30 may also selectively generate a vibratory action. To do so, the electromagnet 92 is energized, thereby pulling the coupler 60 back into a retracted position from its default deployed position. In the retracted position, the coupler 60 is disengaged from the flip cover 20 and the coupler 60 is free to rotate without imparting rotational force against the flip cover 20. That is, the shaft 42 and coupler 60 may spin without causing the flip cover 20 to open or close. Once the shaft 42 is retracted, the motor 50 is energized to spin the shaft 42, preferably at a high spin rate. Because the weight 58 is disposed non-symmetrically about the shaft 42, the spinning of the eccentric weight 58 will impart a shaking motion to the overall phone 10. This vibratory action may be continuous, or may be intermittent, depending on the operation of the motor 50. In addition, the coupler 60 may be returned to the deployed position between the intermittent vibratory actions, or may be kept on the retracted position.

Figure 4:
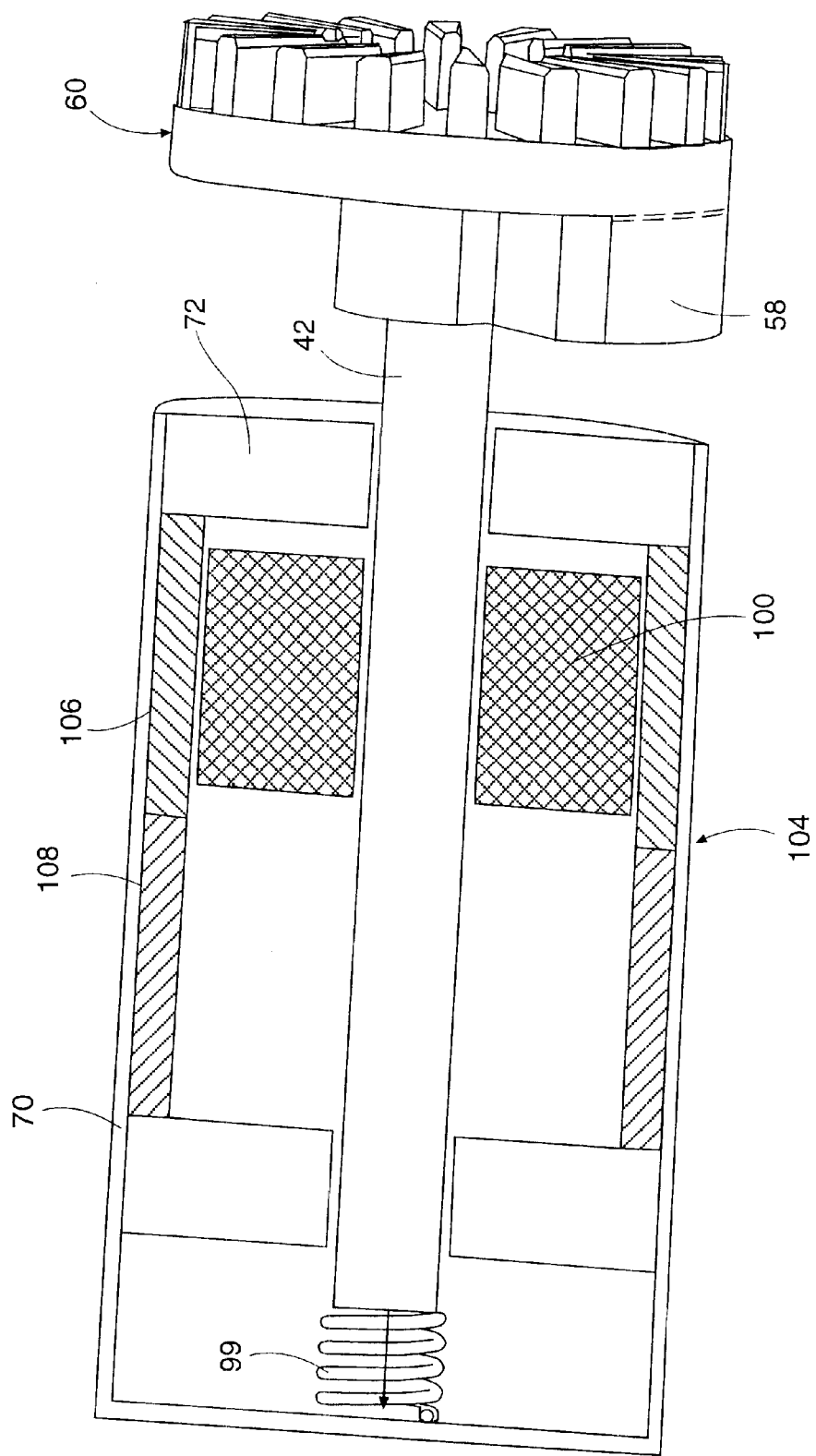
FIG. 4 is a mechanical schematic view of another embodiment of the rotary damper of the present invention.

An alternative equivalent embodiment is shown in FIG. 4. This embodiment is similar to that of FIG. 3 except that the motor 50 and actuator 90 of the clutch 40 have been combined. In this embodiment, a magnetic rotor 100 is secured to the shaft 42 by any suitable means known in the art. The rotor 100 should be fixed both rotationally and axially on the shaft 42. Surrounding the rotor 100 are stator-windings 104, divided into two sections 106,108. The section closer to the coupler 60 is the damper section 106 and the section farther from the coupler 60 is the vibrator section 108. While not shown in FIG. 4, the shaft 42 may be biased towards the deployed position by any means known in the art, such as by a spring. Alternatively, the damper section 106 of the stator 104 may be energized in a default condition, but this is believed to generate an undue power drain. The FIG. 4 embodiment performs the rotational dampening in a similar manner as described above; however, the clutch 40 movement to the retracted position is achieved slightly differently. When a vibratory action is needed, such as to silently alert the user to an incoming call, the damper section 106 of the stator windings 104 are turned off and the vibrator section 108 of the windings 104 are turned on. When energized, the windings of the vibrator section 108 attract the rotor 100, causing the rotor 100 to move axially (to the left in FIG. 4) so as to move the coupler 60 to the retracted position. Thereafter, the windings of the vibrator section 108 are controlled in a conventional manner to cause the rotor 100 to turn, thereby spinning the eccentric weight 58. Preferably, the windings of the vibrator section 108 are denser or otherwise designed to be stronger than in the damper section 106 and operate at higher rotational speeds.

In some embodiments, the rotary damper 30 may optionally be used to not only dampen the rotation of the flip cover 20, but also to cause the flip cover 20 to open. That is, a motorized flip cover 20 opening operation may be initiated, such as by the user pressing an open switch on the phone 10; and, in response, the motor 50 may be used to open the flip cover 20, via the shaft 42 and the coupler 60. Because the motor 50, in such a situation, would spin at a controlled rate, the motor 50 would simultaneously be opening the flip cover 20 at a given speed and dampening the rotational motion of the flip cover 20 at speeds other than the given speed. Using the rotary damper 30 in such a fashion would use a non-trivial amount of power to drive the motor 50; therefore, such an option may be infrequently used. In addition, in some embodiments, the motor 50 may be energized to hold the flip cover 20 in the open position while the phone 10 is in use.

In some embodiments, the coupler 60 may be coupled to the shaft 42 via a gear reduction system (not shown). Such a gear reduction system may be of any suitable type known in the art, but is preferably a planetary gear system. The purpose of the gear reduction system is to allow the shaft 42 to rotate at a higher speed relative to the coupler 60. It is believed that electromagnetic motors, and particularly miniaturized versions, operate best at speeds at or above 5,000 rpm. However, such speeds may be too fast for proper vibratory action and/or rotary dampening. As such, some sort of step-down gearing between the shaft 42 and the coupler 60 may be desirable. In addition, the gear reduction system may optionally be disposed along the shaft so as to allow the coupler 60 and the weight 58 to rotate at different rates, such as by having the weight 58 attach to the shaft 42 inwardly from the gear reduction system. Obviously, in such situations, the weight 58 would need to be separate from the coupler 60. It should be noted that the gear reduction system preferably transmits rotational drive forces in both directions so that, at least, the coupler 60 drives the shaft 42 in the deployed position and the shaft 42 drives the weight 58 in the retracted position.

Further, while the present discussion has assumed that the complex coupler 60 of FIGS. 2 and 3 is affixed to the shaft 42, so that the clutch 40 operates by moving the coupler 60, such is not strictly required. Indeed, the clutch 40 may include an axially moveable shaft 42 that includes a coupler 60 that is merely a keyed end portion of the shaft 42. Such a coupler 60 may inserted into a corresponding keyway (not shown) on the flip cover 20 in the deployed position and removed therefrom in the retracted position. Thus, it is not necessary that the clutch 40 include a complex coupler 60 as shown in FIGS. 2 and 3 in order to function.

Further, while the rotary damper 30 is secured to the main housing 12 in most embodiments of the present invention, in some embodiments the rotary damper 30 is instead secured to the cover 20. In such embodiments, the clutch 40 of the rotary damper 30 is operable to selectively engage the main housing 12 and the motor 50 preferably acts as a dynamic brake to resist the rotational motion of the main housing 12 relative to the cover 20. Of course, in such embodiments, the main housing 12 should be adapted to properly mate with the coupler 60 when the clutch 40 is in the deployed position. Thus, the present invention operates whether the rotary damper 30 is secured to the main housing 12 or to the cover 20.

While the rotary damper 30 may be constructed from any number of materials, it is believed that acceptable results may be achieved if the shell of the generally cylindrical casing 70 is made from thin aluminum tubing, the end caps 72,74 are made from nylon, and the coupler 60 and shaft 42 made from glass impregnated nylon. Further, the weight 58 may be any suitable mass, depending on the overall mass of the phone 10 and other design considerations well known in the art. Weights 58 in the range 0.1 gram to 1 gram are believed to be suitable, but larger or smaller weights 58 may be used, depending on the application.

The rotary damper 30 of the present invention allows for the rotational damper 106 and the vibrator 108 of a wireless communications device 10 to be combined into a single compact package. The motor 50 of the rotary damper 30 is used to both resist the rotation of the flip cover 20 (via the coupler 60 and shaft 42) when the coupler 60 is in the deployed position and to spin the eccentric weight 58, when appropriate, when the coupler 60 is in the retracted position.

A wireless communications device 10 equipped with the rotary damper 30 of the present invention relies on electromotive damping force from a motor 50 to provide the dynamic braking of the rotational movement between the main housing 12 and the cover 20. Because this electromotive force may be easily controlled, the rotary damper 30 provides greater flexibility in function. In addition, including the optional eccentric weight 58 allows for a single compact package to function as both a rotary damper and a vibrator. The motor 50 of the rotary damper 30 may thus be used to both resist the rotation of the flip cover 20 (via the coupler 60 and shaft 42) when the coupler 60 is in the deployed position and to spin the eccentric weight 58, when appropriate, when the coupler 60 is in the retracted position.

The present invention may, of course, be carried out in other specific ways than those herein set forth without departing from the spirit and essential characteristics of the invention. For instance, the description above has assumed that the coupler 60 is retracted when spinning the eccentric weight 58 and that the coupler 60 directly engages the flip cover 20. However, neither is required. Instead, some embodiments of the present invention may include configurations where the coupler 60 is indirectly coupled to the flip cover 20 and/or the "deployed" position is a position where the coupler 60 is closer to the casing 70 than in the "retracted" position.

The described embodiments are, therefore, to be considered in all respects as illustrative and not restrictive, and all changes coming within the meaning and equivalency range of the appended claims are intended to be embraced therein.

What is claimed is:

1. A rotary damper for a wireless communications device having a housing and a cover rotatably attached to the housing, comprising:
    a) a motor secured to either of said housing or said cover;
    b) a clutch selectively operatively connecting said motor to the other of said housing or said cover so that the relative rotational movement between said housing and said cover in at least one rotational direction is resisted by said motor when said clutch is in an engaged position; and
    c) an eccentric weight rotatably driven by said motor so as to generate a vibration when said clutch is in a disengaged position.

2. The rotary damper of claim 1 wherein said motor is secured to said housing and said clutch selectively connects said motor to said cover so that the relative rotational movement between said housing and said cover in at least one rotational direction is resisted by said motor when said clutch is in said engaged position.

3. The rotary damper of claim 1 wherein said clutch includes an axially moveable coupler for engaging and disengaging said motor from said other of said housing or said cover.

4. The rotary damper of claim 3 wherein said coupler directly engages and disengages from said other of said housing or said cover.

5. The rotational damper of claim 3 wherein said coupler includes a generally planar surface having a plurality of outwardly extending radial teeth.

6. The rotary damper of claim 1 wherein said clutch selectively operatively connects said motor to the other of said housing or said cover so that the relative rotational movement between said housing and said cover in at least two rotational directions is resisted by said motor when said clutch is in said engaged position.

7. The rotary damper of claim 1 wherein said clutch includes a coupler axially moveable between a deployed position and a retracted position and an actuator moveable between a first position and a second position so as to cause said coupler to assume said deployed position and said retracted position, respectively.

8. The rotary damper of claim 7 wherein said actuator includes a spring to bias said coupler towards said deployed position.

9. The rotary damper of claim 7 wherein said actuator includes an electromagnet.

10. The rotary damper of claim 7 wherein said actuator includes a solenoid.

11. The rotary damper of claim 1 wherein said motor provides resistance to the relative rotational movement between said housing and said cover in an unpowered state.

12. The rotary damper of claim 1 wherein said motor is an electromagnetic motor.

13. The rotary damper of claim 1 wherein said motor intermittently spins said eccentric weight when said clutch is in said disengaged position.

14. The rotary damper of claim 1 wherein, with said clutch in said engaged position, said motor is selectively operative to hold the cover open.

15. A rotary damper for a wireless communications device, the wireless communications device having a cover moveable between closed position and an open position by rotation about an axis, comprising:
    a) a shaft disposed generally along said axis;
    b) an electromagnetic motor operative to selectively spin or resist the spinning of said shaft;
    c) a coupler attached to said shaft proximate one end of said shaft and movable between a deployed position and a retracted position, wherein said coupler is rotationally coupled to the cover in said deployed position, and wherein said coupler is rotationally decoupled from the cover in said retracted position;
    d) an eccentric weight rotationally coupled to said shaft;
    e) wherein, with said coupler in said deployed position, said motor resists the rotational movement of the cover; and
    f) wherein, with said coupler in said retracted position, said motor:
        i) selectively spins said eccentric weight via said shaft, thereby generating a vibratory motion; and
        ii) does not resist the rotational movement of said cover.

16. The rotary damper of claim 15 further including an actuator coupled to said shaft and moveable between a first position and a second position so as to cause said coupler to assume said deployed position and said retracted position, respectively, said actuator including electromagnet disposed at least partially around said shaft.

17. The rotary damper of claim 16 wherein said actuator includes a spring to bias said head to said deployed position.

18. The rotary damper of claim 16 wherein said motor intermittently spins said eccentric weight when said coupler is in said retracted position.

19. The rotary damper of claim 16 wherein said coupler rotates at a slower speed relative to said shaft.

20. A wireless communications device, comprising:
    a) a main housing;
    b) a cover rotatably attached to said main housing; and
    c) a rotary damper including a motor, said rotary damper selectively coupled to said cover for dynamically braking the rotational movement of said cover relative to said main housing in at least one direction in a first operating mode.

21. The wireless communications device of claim 20 wherein said rotary damper is secured to either said main housing or said cover.

22. The wireless communications device of claim 20 wherein said rotary damper is secured to said main housing and wherein said rotary damper includes a clutch that operatively couples said motor to said cover in said first operating mode.

23. The wireless communications device of claim 22 wherein said clutch operatively uncouples said motor from said cover in said second operating mode.

24. The wireless communications device of claim 20 wherein said rotary damper is secured to said cover and wherein said rotary damper includes a motor and a clutch that operatively couples said motor to said main housing in said first operating mode.

25. The wireless communications device of claim 24 wherein said clutch operatively uncouples said motor from said main housing in said second operating mode.

26. The rotary damper of claim 20 wherein the wireless communications device is a cellular telephone and wherein said cover is a flip cover.

27. The wireless communications device of claim 20 wherein said motor is an electromagnetic motor integral to said rotary damper, and wherein said electromagnetic motor provides said rotational dynamic braking in said first operating mode.

28. A wireless communications device comprising:

a main housing;

a cover rotatable attached to said main housing; and a rotary damper including a motor, said rotary damper selectively coupled to said cover for dynamically braking the rotational movement of said cover relative to said main housing in at least one direction in a first operating mode;

wherein said rotary damper generates a vibration in a second operating mode.

29. The wireless communications device of claim 28 wherein said rotary damper includes a shaft driven by said motor in said second operating mode and an eccentric weight attached to said shaft to induce vibration when said shaft is rotated in said second operating mode.

30. A wireless communications device, comprising:

a) a main housing;

b) a cover rotatably attached to said main housing; and c) a rotary damper secured to said main housing and selectively coupled to said cover for dynamically braking the rotational movement of said cover relative to said main housing in a first operating mode and generating a vibration in a second operating mode; said rotary damper including:

i) a motor;

ii) a clutch that operatively couples said motor to said cover in said first operating mode and operatively uncouples said motor from said cover in said second operating mode, said clutch including a shaft driven by said motor in said second operating mode; and iii) an eccentric weight attached to said shaft to induce vibration when said shaft is rotated in said second operating mode.

31. The rotary damper of claim 30 wherein the wireless communications device is a cellular telephone and wherein said cover is a flip cover.

* * * * *